3,169,809
WHEEL BEARING SEAL
Alfred H. Pendleton, 902 W. Hadley St., Whittier, Calif.
Filed Jan. 7, 1963, Ser. No. 249,865
4 Claims. (Cl. 308—187.1)

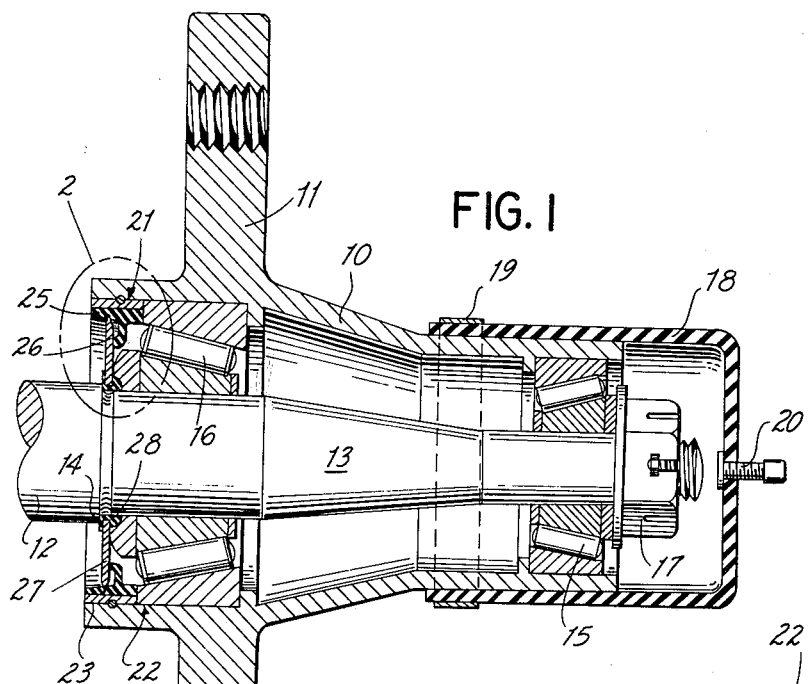
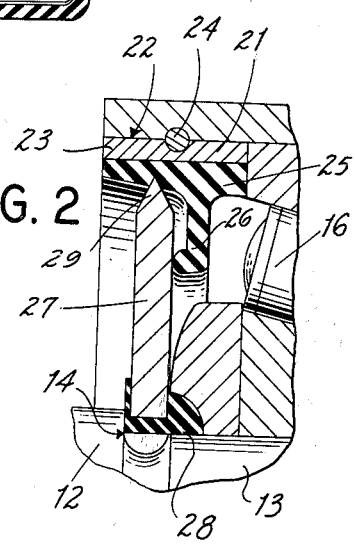
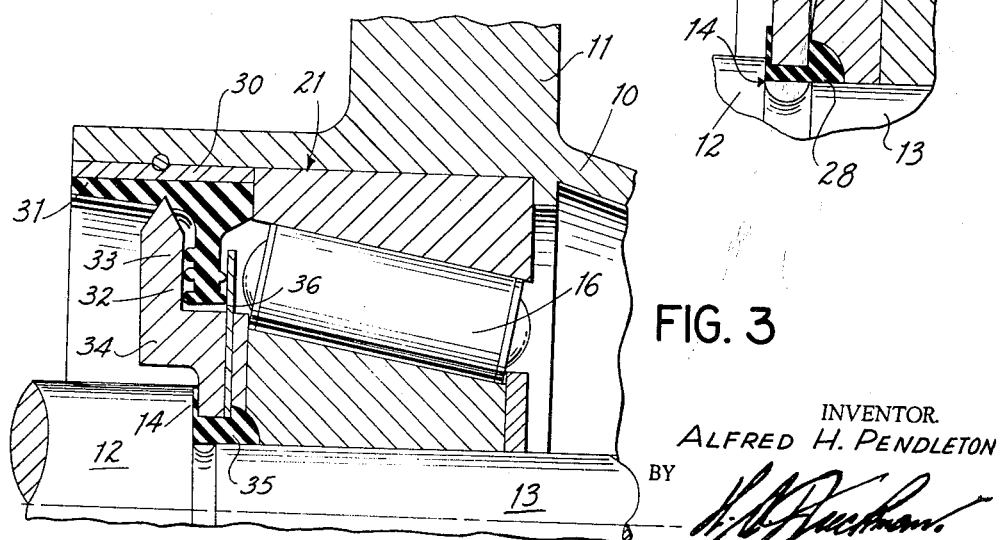

This invention relates to a wheel bearing seal, and is especially applicable to boat trailers, and the like, where the wheels are frequently immersed in water during the loading and unloading of a boat from the trailer.

My wheel bearing seal is an improvement in Patent No. 3,003,834, dated October 10, 1961.

An object of my invention is to provide a more effective seal to retain a lubricant or air pressure within the hub of a vehicle wheel, and also to prevent the seepage of water into the wheel hub in the event that the wheel is submerged, as when a boat is loaded or unloaded from a trailer.

Still another object of my invention is to provide a novel rear seal for the vehicle hub which will be yieldably pressed against a stationary ring to effectively prevent escape of air pressure within the hub, and also to prevent the intrusion of dirt or dust onto the wheel bearings.

Still another object of my invention is to provide a novel wheel bearing seal for vehicle hubs which can be easily and quickly mounted on a conventional hub and axle or spindle, and which is also simple in construction and inexpensive to manufacture and effective in use.

Other objects, advantages and features of invention may appear from the accompanying drawing, the subjoined detailed description and the appended claims.

In the drawing:

FIGURE 1 is a vertical sectional view through a conventional wheel hub and upon which my seal is mounted.

FIGURE 2 is an enlarged fragmentary vertical sectional view taken within the dash and dot ellipse 2 in FIGURE 1.

FIGURE 3 is an enlarged fragmentary vertical sectional view showing a modified form of bearing seal.

Referring more particularly to the drawing, some of the conventional parts of a wheel mounting are illustrated and these consist of a wheel hub 10, the flange 11 of the hub, and the axle 12 upon which the hub is mounted. A spindle 13 extends from the axle 12 and is preferably an integral part of the axle. A shoulder 14 is arranged between the axle 12 and the spindle 13 and this part is usual and well known in the art. A front bearing 15 is positioned between the spindle 13 and the hub 10, and a second or rear bearing 16 is also mounted between the hub 10 and the spindle 13. These bearings are here shown as roller bearings, although other types might be employed if desired. A nut 17 is screwed onto the outer end of the spindle 13 to hold the hub and the bearings 15–16 in position. To properly lubricate the bearings 15–16 the hub 10 is packed with a suitable oil or grease, and it is desirable to prevent water, dust, dirt, and the like from entering the hub to interfere with the proper functioning of the bearings 15–16. To effectively exclude foreign material from the hub 10 either or both of two elements are utilized. One is a means of maintaining air pressure within the hub 10 above atmospheric consisting of an elastic rubber or plastic cup 18, which is secured to the hub 10 by means of a metal band 19. An air valve 20 in the cup 18 permits air under pressure to be forced into the hub 10, so that the inside of this hub is maintained under a pressure above atmospheric.

A rear seal 21 is fitted within the annular recess 22 within the hub 10 and consists of the following parts: A metal ring 23 accurately fits the recess 22, and an O-ring 24 might be employed between the recess 22 and the ring 23 to effectively seal the ring relative to the hub 10. A packing 25 is fixedly secured to the inside of the ring 23 by a suitable adhering process. The packing 25 is made of rubber or an elastic plastic so that it may flex, for purposes to be subsequently described. An inwardly projecting lip 26 is integrally formed on the packing 25 and acts as a seal, as will be subsequently described. A metal disk 27 is fitted onto the spindle 13 and rests against the shoulder 14. A rubber or plastic grommet 28 closely fits the spindle 13 and is also fitted onto the inner edge of the disk 27. The outer edge of the disk 27 is pointed or sharpened, as shown at 29, so that it will embed into the packing 25 and create a seal at this point.

Any pressure within the hub 10 will thus flex the lip 26 outwardly and press this lip tightly against the inner face of the disk 27 to provide an effective seal at this point and prevent leakage of air, and also prevent the intrusion of water, dirt or dust. The recess 22 in the hub 10 is machined in order to receive the bearing 16 and, consequently, the seal assembly 21 will accurately fit within this recess. Also the disk 27 will be accurately fitted on the spindle 13 and will fit between the shoulder 14 and the outer surface of the inner race of the bearing 16.

In FIGURE 3 I have illustrated a modified form of inner wheel bearing seal in which the metal ring 30 is again accurately fitted within the recess 21 of the hub 10. The rubber or plastic packing 31 is welded or otherwise fixedly secured to the ring 30. The packing 31 is formed with an inwardly projecting lip 32 similar to the lip 26 previously described, except that this lip has small nubbins on both surfaces as shown at 33, so that it will pack-off in two directions. The disk 34 is mounted in the same manner as previously described for the disk 27, that is, it mounts on the spindle 13 and is provided with a rubber grommet 35 to closely grip that spindle. A thin metal annulus 36 is positioned between the inner face of the disk 34 and the outer edge of a race of the bearing 16. Thus the lip 32 will be positioned between the disk 34 and the annulus 36, and the lip can flex either inwardly or outwardly to engage one of these two parts and thus seal the hub 10 either when there is pressure within the hub above atmospheric, or if there is a partial vacuum or reduced pressure within the hub below atmospheric. The lip 32 can flex in two directions and thus accomplish a pack-off function when engaging either the disk 34 or the annulus 36.

Having described my invention, I claim:

1. The combination of a wheel bearing seal and a bearing assembly comprising:
    a hollow tubular hub surrounding an axle spindle;
    bearings in said hub riding on said spindle,
    a wheel bearing seal sealing the inner extremity of said hub to said spindle,
    said seal including an annular packing,
    means mounting the packing in the hub,
    a flat and radially extending disk adjacent to the packing, said disk being mounted on the spindle,
    means on the packing slidably engaging the flat side of the disk to seal against the same,
    a metal annulus mounted on the spindle and spaced from said disk,
    said last named means being positioned between the disk and said metal annulus.

2. The combination of a wheel bearing seal and a bearing assembly comprising:
    a hollow tubular hub surrounding an axle spindle;
    bearings in said hub riding on said spindle,
    a wheel bearing seal sealing the inner extremity of said hub to said spindle,
    said seal including an annular packing,
    means mounting the packing in the hub, a flat and radially extending disk adjacent to the packing, said disk being mounted on the spindle,
an inwardly extending lip on the packing slidably engaging the flat side of the disk to seal against the same,
a metal annulus mounted on the spindle and spaced from said disk,
said lip being positioned between the disk and said metal annulus.

3. The combination of a wheel bearing seal and a bearing assembly comprising:
a hollow tubular hub surrounding an axle spindle;
bearings in said hub riding on said spindle,
a wheel bearing seal sealing the inner extremity of said hub to said spindle,
said seal including an annular packing,
means mounting the packing in the hub,
a flat and radially extending disk adjacent to the packing, said disk being mounted on the spindle,
means on the packing slidably engaging the flat side of the disk to seal against the same,
a metal annulus mounted on the spindle and spaced from said disk,
said last named means being positioned between the disk and said metal annulus,
a hub cup inclosing the outer extremity of said hub about said spindle,
means securing the cup to the hub,
and an air valve in said hub cup to admit air under pressure to the cup and the hub.

4. The combination of a wheel bearing seal and a bearing assembly comprising:
a hollow tubular hub surrounding an axle spindle;
bearings in said hub riding on said spindle,
a wheel bearing seal sealing the inner extremity of said hub to said spindle,
said seal including an annular packing,
means mounting the packing in the hub,
a flat and radially extending disk adjacent to the packing, said disk being mounted on the spindle,
an inwardly extending lip on the packing slidably engaging the flat side of the disk to seal against the same,
a metal annulus mounted on the spindle and spaced from said disk,
said lip being positioned between the disk and said metal annulus,
a hub cup inclosing the outer extremity of said hub about said spindle,
means securing the cup to the hub,
and an air valve in said hub cup to admit air under pressure to the cup and the hub.

References Cited by the Examiner
UNITED STATES PATENTS

| | | | |
|---|---|---|---|
| 2,657,104 | 10/53 | Kayser | 277—05 XR |
| 2,705,164 | 3/55 | Dasse | 277—39 |
| 2,958,551 | 11/60 | Rogers | 308—36.1 |
| 2,990,201 | 6/61 | Stephens | 308—187.2 XR |
| 3,000,675 | 9/61 | Larkin | 308—187.1 |
| 3,003,834 | 10/61 | Pendleton | 308—187.1 |
| 3,064,982 | 11/62 | Stephens | 277—95 |
| 3,089,738 | 5/63 | Steiner | 308—187 |

ROBERT C. RIORDON, *Primary Examiner.*

FRANK SUSKO, *Examiner.*